United States Patent
Mori et al.

(10) Patent No.: US 10,503,054 B2
(45) Date of Patent: Dec. 10, 2019

(54) METHOD AND APPARATUS FOR THE INSPECTION OR OPERATIONAL OBSERVATION OF DANGEROUS, HARSH SPACES OR SPACES WITH HOSTILE ENVIRONMENTAL CONDITIONS

(71) Applicant: Tenova S.p.A., Milan (IT)

(72) Inventors: Cristian Mori, Moon Township, PA (US); Francesco Memoli, Pittsburgh, PA (US)

(\*) Notice: Subject to any disclaimer, the term of this patent is extended or adjusted under 35 U.S.C. 154(b) by 0 days.

(21) Appl. No.: 15/771,002

(22) PCT Filed: Dec. 15, 2016

(86) PCT No.: PCT/EP2016/081149
§ 371 (c)(1),
(2) Date: Apr. 25, 2018

(87) PCT Pub. No.: WO2017/102926
PCT Pub. Date: Jun. 22, 2017

(65) Prior Publication Data
US 2018/0307125 A1    Oct. 25, 2018

(30) Foreign Application Priority Data
Dec. 17, 2015  (IT) .......... 102015000084673

(51) Int. Cl.
*G03B 17/56*   (2006.01)
*G08B 13/196*  (2006.01)
(Continued)

(52) U.S. Cl.
CPC .......... *G03B 17/561* (2013.01); *F16M 11/18* (2013.01); *G03B 17/02* (2013.01); *G03B 35/08* (2013.01);
(Continued)

(58) Field of Classification Search
CPC ................................................. G08B 13/1963
(Continued)

(56) References Cited

U.S. PATENT DOCUMENTS 3,504,122 A \* 3/1970 Ratliff, Jr. .............. H04N 13/00
                                                                   318/16
4,131,914 A \* 12/1978 Bricmont ................ C10B 29/06
                                                                   348/208.99
(Continued)

*Primary Examiner* — Clayton E. LaBalle
*Assistant Examiner* — Kevin C Butler
(74) *Attorney, Agent, or Firm* — Themis Law

(57) ABSTRACT

A method and apparatus for the inspection of a hostile environment includes a sensorized device carrying a plurality of image sensors positioned with different orientations, so as to detect image data of the hostile environment; a support adapted to support the sensorized device in the hostile environment; a processor of the image data generating a spherical and/or three-dimensional image based on the image data; and a remote display device with respect to the sensorized device adapted to be positioned outside the hostile environment and in communication with at least the processor of the image data, the apparatus being adapted for a hostile environment with temperatures and/or atmospheric contaminants harmful or dangerous for human beings, and the plurality of sensors detecting contemporaneous image data of at least 60% of $4\pi$ steradians of the hostile environment.

12 Claims, 4 Drawing Sheets

(51) Int. Cl.
*F16M 11/18* (2006.01)
*G08B 17/00* (2006.01)
*G03B 17/02* (2006.01)
*G03B 35/08* (2006.01)
*G03B 37/04* (2006.01)
*H04N 5/33* (2006.01)
*H04N 5/225* (2006.01)
*H04N 5/32* (2006.01)

(52) U.S. Cl.
CPC ......... *G03B 37/04* (2013.01); *G08B 13/1963* (2013.01); *G08B 13/19619* (2013.01); *G08B 13/19632* (2013.01); *G08B 17/00* (2013.01); *H04N 5/332* (2013.01); *H04N 5/32* (2013.01); *H04N 2005/2255* (2013.01)

(58) Field of Classification Search
USPC ......................................................... 396/427
See application file for complete search history.

(56) References Cited

U.S. PATENT DOCUMENTS

| | | | | |
|---|---|---|---|---|
| 5,162,906 | A * | 11/1992 | Yorita | F27D 21/02 348/83 |
| 5,169,233 | A * | 12/1992 | Montgomery | G01J 5/0003 348/164 |
| 6,357,910 | B1 * | 3/2002 | Chen | G01J 5/041 374/127 |
| 2011/0295399 | A1 * | 12/2011 | Plociennik | B22D 7/00 700/97 |
| 2013/0120738 | A1 * | 5/2013 | Bonin | G01N 25/72 356/72 |
| 2014/0267596 | A1 * | 9/2014 | Geerds | H04N 5/2252 348/38 |
| 2015/0084246 | A1 * | 3/2015 | Tang | F27D 9/00 266/46 |
| 2015/0192365 | A1 * | 7/2015 | Koubek | C21C 5/4673 348/83 |
| 2018/0307125 | A1 * | 10/2018 | Mori | G03B 17/02 |

* cited by examiner

METHOD AND APPARATUS FOR THE INSPECTION OR OPERATIONAL OBSERVATION OF DANGEROUS, HARSH SPACES OR SPACES WITH HOSTILE ENVIRONMENTAL CONDITIONS

FIELD OF THE INVENTION

The invention relates to the field of plants or equipment where direct visual inspection for maintenance, repair or supervision for operational purposes cannot be effected as they are not accessible to human presence or can be dangerous due to the geometry, high temperature, toxic environment, illumination or other dangerous conditions of said plants or equipment.

BACKGROUND OF THE INVENTION

There are a certain number of plants or apparatuses which require a visual inspection (for example walls or contents, general wear, etc.); this cannot be effected directly, however, due to hostile or aggressive environmental conditions, or due to the exposure to hazards to which a human being can be subjected when gaining access to said hostile environments.

Examples of plants or apparatuses where the present invention can be applied are steelmaking electric furnaces, gas heating furnaces, coke ovens, glass melting furnaces, hot gas stacks, nuclear plants, buildings or rooms on fire, reheating furnaces, confined areas with possibly toxic conditions, etc. These plants or apparatuses require periodical visual inspections of their conditions (for example, where they are coated with refractory material, in order to determine the degree of wear of the coating due to their normal functioning) and, if necessary, effect the necessary repairs for avoiding costly damage or an extensive and unexpected shut-down periods with the consequent production losses.

It is known in the state of the art that, even with a protection system (for example, cooling systems used for protecting cameras from high temperatures), the survival time of a camera in a hostile environment, i.e. with temperature characteristics and/or atmospheric contaminants harmful or dangerous for human beings, for example in a steel production furnace, is limited, and there is therefore the necessity of a control system that can produce a detailed view of the environment in an extremely short time, but with specific details and a visual amplitude that are such as to allow the operator and/or maintenance personnel to take decisions which may cause stoppage for effecting repairs or maintenance on the equipment monitored or continuation of the production.

It is also known also that display systems having a camera mounted on a movable base so that it can be moved by remote control in different directions—for example by means of a robot or a PTZ (pan-tilt-zoom) system—are not practical as the time for the inspections is sometimes extremely short and the limited field of view of this device imposes a constraint in the already limited time for the inspection, as the operator must manually direct the camera to look for faults, and also because the moving parts and mechanical/electrical components of the camera system tend to deteriorate as a result of the high temperatures, dusty environments or more generally due to the aggressive conditions of such environments.

The known practice also provides for undertaking rapid inspections, using conventional cameras, both fixed and movable, used during non-operational intervals or through small peep windows with a limited viewing angle and short-term assessments (in the necessity of continuing the production cycles of the equipment) or using a camera that can be moved in different directions to be focused on the desired areas on the inner side of the equipment, but always for short periods of time.

As can be easily understood from the above description, the known solutions have significant limitations and are not entirely satisfactory.

More specifically, the current praxis and technology used for inspecting and monitoring equipment, for example high-temperature furnaces, such as electric arc furnaces for the production of steel, have certain limitations; in order to effect an accurate control of the inside of the electric furnace for example, the cameras should remain inside the furnace for a longer period of time than the time currently allowed in a normal shutdown, i.e. during the time following each casting, after the discharging of the liquid steel and beginning of the loading of the subsequent ferrous materials.

Even if the camera used for the control is equipped with a good cooling system, it can hardly resist the temperature of the furnace, which can exceed 1,000° C. in some cases.

Under these conditions, the camera can remain in this environment for much less than a minute, with a consequent limitation in the data that can be collected.

The remaining mechanical/electrical/electronic movable devices necessary for the functioning of the camera (focusing, movement, etc.) also have a short lifespan within these hot environments.

Various proposals have been found in the prior art aimed at solving the problem of the inspection of industrial plants, using video-cameras.

U.S. Pat. No. 5,162,906 of Yorita el al. describes an apparatus for observing the interior of a hot furnace using a camera protected by a water-cooled casing and also being cooled by blowing cooling air in order to keep the camera at a temperature of 50° C. or less, whereas the temperature of the furnace is about 1,200° C. The apparatus of Yorita can be used for the inspection of the refractory coating of coke ovens, blast-furnaces, metal mixers, mixing containers, etc. This solution, however, does not allow a complete image of the interior of the furnace to be revealed, or alternatively it requires relatively lengthy times, incompatible with the exposure time of the video camera to heat; the analysis, moreover, can only be effected in conjunction with the data recovery.

U.S. Pat. No. 6,111,599 in the name of Nance, is also aimed at protecting the camera from hostile environmental conditions, wherein the camera is inserted within a transparent double-wall group. This solution on the whole has limits analogous to those indicated above.

U.S. Pat. No. 6,229,563 in the name of Miller II et al. discloses a monitoring system for a furnace wherein the temperature often exceeds 2,000° F. A camera mounted at the end of a fluid-cooled lance is introduced into a furnace by an operator outside the furnace. A video-camera is used for inspecting a high-temperature furnace: the video-camera allows any part of the furnace to be accurately viewed.

Although this solution is functional, it requires a relatively lengthy time for directing the video-camera in the various sensitive areas of the furnace in order to frame them.

The document WO 2014/152855 A2 describes a camera-mounting system, having a plurality of cameras, wherein the lens of each camera is oriented towards an area of interest, so that they can provide a completely spherical obstruction-free image or video. Although in some ways interesting, the embodiment described in this patent, however, cannot be used for controlling hostile environmental spaces or for recording the images of an industrial plant for detecting wear variations that require preventive or corrective actions for maintaining the production capacity of these plants; the data that can be obtained, moreover, are purely image data.

US patent application No. 2015/0285559 describes a device for monitoring inside a high-temperature furnace, comprising one or two cameras that are introduced into the high-temperature furnace and used for determining the size of the deposits in a melting furnace. This solution, however, uses stereography for generating a 3D estimation of a limited area, thus having a relatively restricted breadth of vision of the furnace, in addition to substantially having the same drawbacks as the first two documents mentioned.

The documents cited in this text (comprising the patents previously listed), and all the documents mentioned or indicated in the documents cited in this text, are incorporated herein for reference. Documents incorporated for reference in the present text or any teaching therein, can be used in the practice of the present invention.

U.S. Pat. No. 3,504,122 relates to a stereoscopic television system with means for controlling the movement of the video-camera from a remote location.

U.S. Pat. No. 4,131,914 relates to a method and apparatus for inspecting the refractory coating in a furnace. This system is composed of a video-camera mounted in a cooled container, which, by means of a cable, transmits a television signal outside the furnace, which is then displayed in real time in an external monitor.

OBJECTIVES OF THE INVENTION

The general objective of the invention is to solve the drawbacks of the known art described above.

A further objective of the present invention is to provide a method and an apparatus which allow a detailed inspection to be effected in relatively rapid times, in hostile environments.

Another objective of the present invention is to provide a method and an apparatus which allow the operator of a plant comprising a hostile or harsh environment which is not easily accessible, to have a relatively complete view of said plant.

Yet another objective of the invention is to provide a method and an apparatus for retrieving a reconstruction in real time of said plant for identifying and assessing the extent of defects and wear.

A further objective of the invention is to provide a method and an apparatus for allowing the operator of a plant, having a hostile or harsh environment which is not easily accessible, to inspect the structure and contents of said industrial plant without interfering with the production program of the same.

Yet another objective of the invention is to provide a method and an apparatus for inspecting high-temperature electric arc furnaces for steel production, that require maintenance interventions between each operation without affecting the productivity of the furnace.

An additional objective of the invention is to provide a method and an apparatus for improving the safety and maintenance of industrial furnaces.

Other objectives of the invention will appear evident to skilled persons in the field, or will be specified in the detailed description of the invention.

SUMMARY OF THE INVENTION

The idea at the basis of the invention is to position in the space undergoing inspection, a device composed of a plurality of sensors arranged for revealing data of predetermined areas of the apparatus inspected, so as to produce a spherical image or 3D structured reconstruction that can be viewed in real or deferred time on a screen, a HMD (Head Mounted Display) a VR headset, or any video-output device and/or that can be studied for a longer time (with respect to the detection time) also at a later moment, as desired, after the images or data have been collected.

A further aspect of the general idea indicated above is to use a plurality of sensors conceived for producing a complete spherical vision of the internal side of said plants or equipment and to memorize the images collected at various times, in order to allow the operator of the equipment to assess the changes that take place with time in said equipment and to consequently take appropriate and sound decisions to effect gradual periodic repairs, if necessary, or to stop the plant for important repair interventions.

In an aspect of the invention, the data are recorded electronically for comparison with new images with time, to reveal changes in the equipment in order to modify the programming of maintenance or repair interventions of the equipment. This comparison can be effected by a trained human being or by an algorithm designed for functioning in combination with the data supplied by the device in order to automatically detect anomalies.

An idea of the invention is to provide a method for inspecting hostile or harsh environmental spaces with positioning means, in said space, of a device which comprises a plurality of sensors arranged in a three-dimensional cluster, wherein each sensor has a different orientation in said space.

In these embodiments, the sensor is provided with optics for video recordings.

The sensors are oriented and cooperate in order to form an omnidirectional spherical image that contemporaneously covers over 80% approximately of $4\pi$ steradians. The data produced revealed by the sensors and/or video-cameras are processed with suitable hardware and/or software on-board or off-board using image-processing techniques, that allow a spherical digital image to be reconstructed. This spherical digital image contemporaneously covers at least over 60% of $4\pi$ steradians, and is available to the operator, who can select and visualize, using appropriate means (which comprise, but not exclusively, a joystick, PC mouse, or smartphones, tablets, virtual reality viewers), one or more spherical portions having the desired dimensions and orientation, directly (i.e. while the device is inside the hostile environment) or at a later moment (i.e. visualizing the images collected by the device after this has been removed from the hostile environment).

An idea of the invention is to provide an apparatus for inspecting hostile or harsh environmental spaces which comprises a device having a plurality of sensors arranged in a three-dimensional cluster, wherein each sensor has a different orientation for forming an omnidirectional spherical image that contemporaneously covers over 80% approximately of $4\pi$ steradians; the apparatus also comprises supporting means suitable for positioning said device within said space and a local data processing unit (on the part of the apparatus that is introduced into the space to be detected) or remote data processing unit (on a part of the apparatus that remains outside the space to be detected); the apparatus also comprises a transmission device for reproducing the data revealed by the sensors to a display device located outside said space.

According to the invention, the omnidirectional spherical image is produced by sensors that operate, alternatingly or in combination, with visible light, infrared radiation, UV light or thermography.

The invention also comprises the manipulation of the data revealed by the sensor to reconstruct a spherical or three-dimensional image of the hostile space.

In a particular embodiment, the sensors can be substituted by commercial autonomous photo- or video-cameras.

DETAILED DESCRIPTION OF PREFERRED EMBODIMENTS OF THE INVENTION

Figure 1:
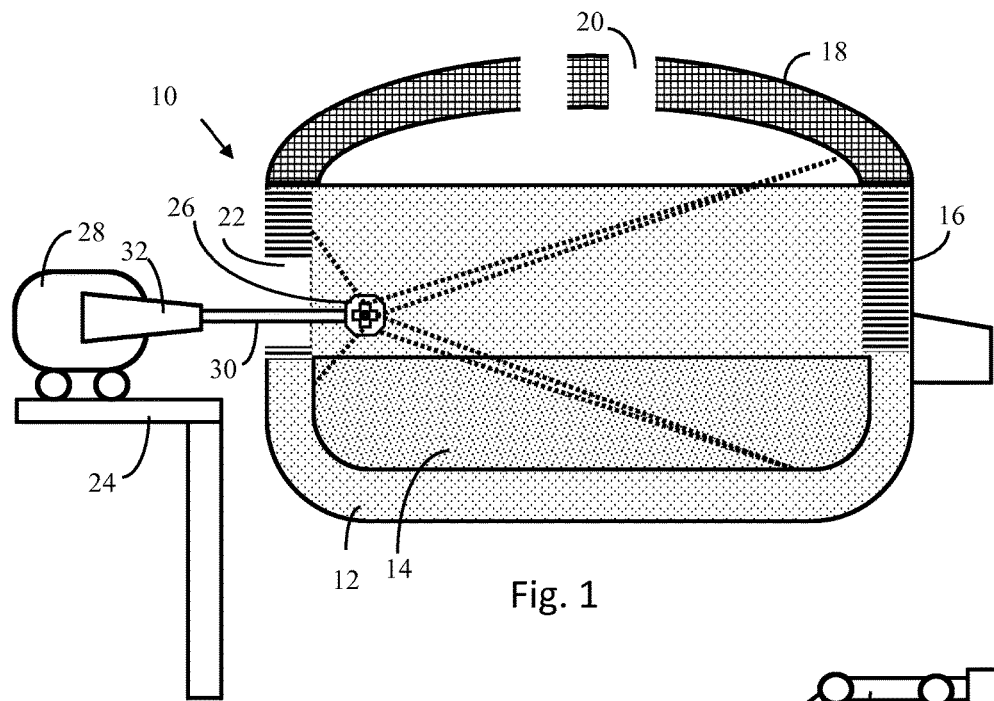
FIG. 1 is a schematic process diagram illustrating an embodiment of the invention wherein the device is introduced into an electric arc furnace for steel production by means of a position-controlled rod.

The invention is described hereinafter first in its general features and then with reference to the example of the enclosed figures.

The inspection apparatus of a hostile environment, according to the invention, comprises:
- a sensorized device 26 comprising in turn a plurality of image sensors 42,44,46,48 positioned with different orientations with respect to each other, so as to detect contemporaneous image data of at least 60% of $4\pi$ steradians of said hostile environment,
- a support 30 destined for supporting said device in said hostile environment,
- processing means of said image data to generate a spherical and/or three-dimensional image on the basis of said image data,
- a remote display device with respect to said sensorized device 26, destined for being positioned outside the hostile environment and in communication with at least the processing means of the image data.

According to an optional and advantageous characteristic of the apparatus according to the invention, the device 26 comprises a protective shell 52, inside which said image sensors 42,44,46,48 are housed.

According to an optional and advantageous characteristic of the apparatus according to the invention, the protective shell comprises a metal body, preferably made of steel, transparent crystals applied to said body, preferably quartz crystals 56,58 and is operatively connected to a cooling unit destined for cooling said shell with a cooling fluid, preferably nitrogen or dry compressed air.

According to an optional and advantageous characteristic, the apparatus according to the invention, comprises stable positioning means, destined for positioning the sensorized device 26 in a pre-determined and fixed position of said environment.

According to an optional and advantageous characteristic, the sensors 42,44,46,48 which form the image are selected from the group of sensors
- sensitive to the visible portion of the light spectrum
- sensitive to the infrared portion of the light spectrum
- sensitive to the ultraviolet portion of the light spectrum
- thermographic, heat sensitive
- sensitive to X rays.

According to an optional and advantageous characteristic, the image sensors 42,44,46,48 are positioned so as to detect contemporaneous image data of at least 90% of $4\pi$ steradians of said hostile environment.

According to an optional and advantageous characteristic, the image data comprise a video film and/or static images.

The method of the invention for inspecting a hostile environment, according to the invention comprises the following steps
a. detecting by means of sensors 42,44,46,48 contemporaneous image data of at least 60% of $4\pi$ steradians of said hostile environment.
b. transmitting said image data outside said hostile environment
c. re-processing said image data in order to reconstruct a spherical and/or three-dimensional image on the basis of said image data.

According to an optional and advantageous characteristic, step a. comprises the phase of introducing a sensorized device 26 for acquiring image data in a predetermined position in said hostile environment, so as to detect image data comparable with time.

According to an optional and advantageous characteristic, step a. comprises the phase of detecting contemporaneous image data of at least 90% of $4\pi$ steradians of said hostile environment.

According to an optional and advantageous characteristic, step a. comprises the phase of detecting image data using sensors sensitive to at least one of the following
- the visible portion of the light spectrum
- the infrared portion of the light spectrum
- the ultraviolet portion of the light spectrum
- thermographic, heat sensitive
- sensitive to X rays.

According to an optional and advantageous characteristic, said image data comprise video films and/or static images.

According to an optional and advantageous characteristic, the method comprises the step of comparing image data relating to the same area of the hostile environment taken at different moments.

With respect now to the example and with specific reference to the figures, in these (from 1 to 5), the elements that are common in all three figures are indicated with the same numbers for easier reference.

A hostile environment to be monitored, i.e. an environment with temperature characteristics and/or atmospheric contaminants harmful or dangerous for human beings, to which non-limiting reference is made in this description, is an electric furnace for steel production.

Other examples of these plants with a hostile environment are gas heating furnaces, coke ovens, glass melting furnaces, hot gas stacks, nuclear plants, buildings or rooms on fire, reheating furnaces, confined areas with a possible toxic environment, etc.

In all of these cases, due to the hostile environment, the plant is not easily available for direct human access, which, however, is necessary for effecting a visual inspection to detect the state and/or a change in the components, for maintenance and/or repair purposes and the like.

In other cases, the environment is defined as being "hostile" when a person is required to effect a visual inspection at a certain height from the ground, for example at a height greater than five metres (e.g. overhead cranes and the like).

Although the description of the invention is effected as applied to an electric arc furnace for steel production, it is evident that the invention can also be adapted to other applications, if applied to a different industrial furnace or hostile environmental space.

Figure 2:
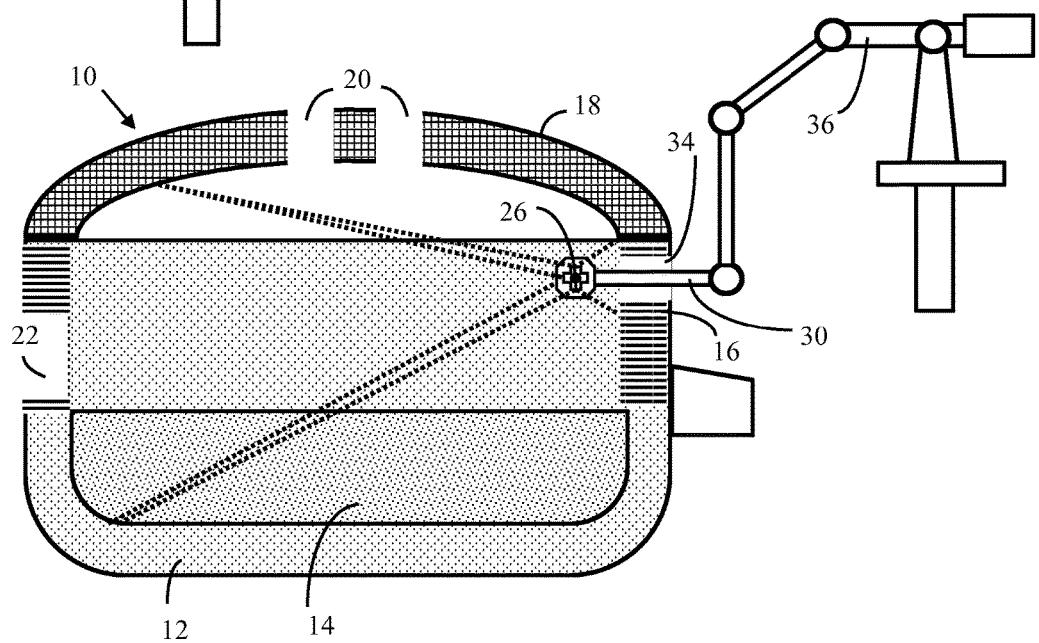
FIG. 2 is a schematic process diagram of another embodiment of the device used in the invention for producing an omnidirectional spherical image of the interior of an electric arc furnace by means of a robotic arm holding and introducing the device, that produces the image, inside the furnace.

With reference to FIGS. 1 and 2, the number 10 generally indicates an electric arc furnace for steel production, comprising a lower portion that forms the melting bed 12, which is coated with refractory materials 14 resistant to the mechanical stress and the high temperatures of molten steel; a central section forming the side walls of the furnace typically composed of water-cooled metallic panels 16 and a top lid 18 also typically composed of water-cooled panels.

The lid of the furnace 18 is provided with one or more openings 20 for the introduction of electrodes, the outlet of gases and for charging metallic-iron-bearing materials such as DRI (direct reduced iron) and steel scrap (not shown for simplicity of the drawing).

A work platform 24 is usually positioned close to a side opening 22 used for the addition of melting products and other materials and also for control when operating.

The electric arc furnace 10 operates blockwise.

The furnace is charged with scrap, reduced iron pellets (DRI) or mixtures thereof and the charge is melted; the temperature inside the furnace is higher than 1,000° C. At the end of each casting, the steel is poured into a ladle for the subsequent refining and melting process, and the interior of the furnace must be inspected to repair any damage to the refractory coating or paneled walls before the furnace is loaded for the subsequent casting.

The productivity of the furnace greatly depends on the time allowed for the inspection and repair operations effected between each casting.

The current practice is that an operator visually inspects the interior of the furnace through the work opening 22, without being able to directly see the whole internal surface of the furnace, making the inspection inadequate and limited due to both the short time and also the visual angle the operator has from outside the furnace.

It should be remembered that there are various proposals in the prior art for installing photo- or video-cameras in a fixed position in the walls of the furnace; these cameras, however, do not provide a satisfactory solution for the operator as the cameras deteriorate due to their exposure to heat radiation, even if provided with cooling protection.

If the cameras are fixed, on the other hand, they only provide an image of the area that can be focused from that position and if the cameras are provided with remotely-controlled movement to cover a wider area of the interior of the furnace, the controls and electro-mechanical actuators also deteriorate due to the high temperatures and hot dusty gases present inside the furnace.

The present invention provides a low-cost and efficient solution to the unmet need for a reliable and rapid control of the furnace.

The invention accordingly comprises a device 26 comprising a plurality of sensors, suitable for being introduced into the furnace for a relatively limited period of time, preferably in the order of about 30 seconds, only for allowing said sensors to collect sequences of data of the portions of the inside of the furnace according to the particular orientation of said sensors.

As schematically shown in the diagram of FIG. 1, the image-forming device 26 can be positioned inside the furnace 10 through the work opening of the furnace 22 by means of a movable trolley 28, which can be moved manually or by a programmed automatic controller, and a rod 30 having a suitable length for introducing the device 26 in a predetermined position.

The trolley 28 can be provided with a position regulator 32 for extending or withdrawing the arm 30 and/or for positioning the device 26 in said predetermined position (or reference position).

Setting a predetermined position (or reference position) for the device 26 inside the furnace 10 guarantees that the images of the interior of the furnace can be compared (either by the operator or automatically by the system), thus allowing the operator to detect changes that require immediate interventions or programmed maintenance.

For this purpose, the apparatus of the invention comprises stable positioning means, for always positioning the device in the same position of the space.

The image sensors are arranged for detecting spherical data (images and possibly 3D data of the environment) in a coordinated manner, symbolized by the dashed lines that indicate the visual angle of the image sensors, so that the data reproduced by the sensors contemporaneously cover over 60%, preferably at least 90%, of $4\pi$ steradians of the spherical view of the apparatus.

With reference to FIG. 2, the image-forming device 26 can also be introduced into the furnace 10 through another suitable opening 34 which can be more convenient, in order to avoid interfering with the operational maneuvers effected during the time between each casting, by means of a programmed robotic arm 36.

The control device 26 can also be used for controlling the state of the refractory material of various types of equipment in the steelmaking industry, for example in electric arc furnace between castings; for seeing points that need to be repaired; in a hot ladle control for accurately controlling bricks from the inside; in a high precision control of the status of the refractory material in other furnaces such as reheating furnaces.

The control device 26 can be used for evaluating the quantity of hot residue remaining in the electric arc furnace after tapping.

The level of residual molten steel can be assessed by visual inspection and the percentage variation in the residual molten steel can be calculated by data processing with software using differential comparisons with the previous video signal.

Figure 3:
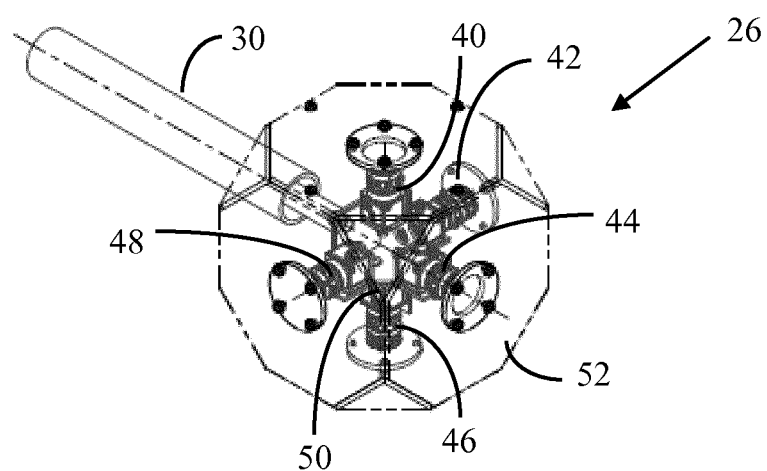
FIGS. 3 and 4 are schematic perspective views of part of the apparatus according to the invention, illustrating the protective casing of the sensors, in detail.
Figure 4:
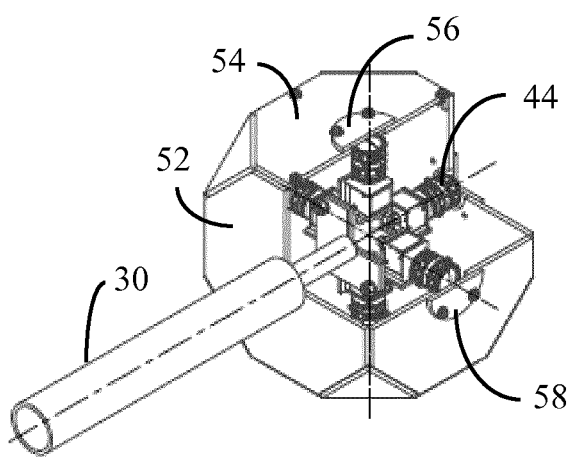

With reference to FIGS. 3 and 4, according to an exemplary embodiment of the invention, the sensors 40, 42, 44, 46 and 48 are arranged in said device 26 so as to form a cluster (or group), with the single sensors oriented so as to acquire data and produce a spherical image from inside the furnace and possibly a spherical or three-dimensional reconstruction of the environment for estimating measurements and defects.

The sensors for forming the image are supported at the end of a stick or rod 30 so that the device can be introduced into the space of the hostile environment and extracted to continue the functioning of the equipment or plant being inspected.

The sensors forming the image can be selected for functioning in the visible portion of the radiation spectrum and/or in infrared or ultraviolet radiation and/or for creating a thermograph, among other alternatives.

The cluster of image-forming sensors is protected in a steel casing 52 (for example a steel box) provided with thick quartz crystals 56 and 58 (only two shown for the sake of simplicity) and cooled with nitrogen or dry compressed air.

Each sensor preferably has a different orientation in the space, and the geometry of the arrangement is such that the whole surrounding spherical environment is covered, approaching the coverage of a solid angle of $4\pi$ steradians (sr).

This wide visual angle is advantageously obtained without the use of any moving part.

In one embodiment, the sensors detect a spherical video ("$4\pi$ SR-video").

In another embodiment of the invention, the sensors detect static images (photographs, thermographs) of the same portion of space.

The device 26 is then removed from the furnace 10, which continues its normal functioning, without any further interruption and consequently the productivity of the furnace is maintained or improved.

According to an aspect of the invention, the "$4\pi$ SR-video" and/or the static images are immediately available for the maintenance team and can be shown repetitively, creating, for example, an uninterrupted "$4\pi$ SR-video" repetition sequence, corresponding, for example, to different detection moments; said "$4\pi$ SR-video" and/or static images can also be manipulated for producing images on screens of the control room of the furnace, or for wireless mobile devices such as tablets or smartphones using the wireless communication technology known in the state of the art.

In principle, the number of sensors of the device of the invention is unlimited, however, considering the real dimensions of the technology available and the calculation speed of the software for the video signal, the number of sensors preferably ranges from five to seven.

In the case of five sensors (as in the example of FIG. 3) and in the case of a substantially cubic box 52, they are arranged on all the sides of the cube, except for one, i.e. that connected to the rod 30.

As the technology, miniaturization and processing power increase, however, more sensors can theoretically be used.

Figure 5:
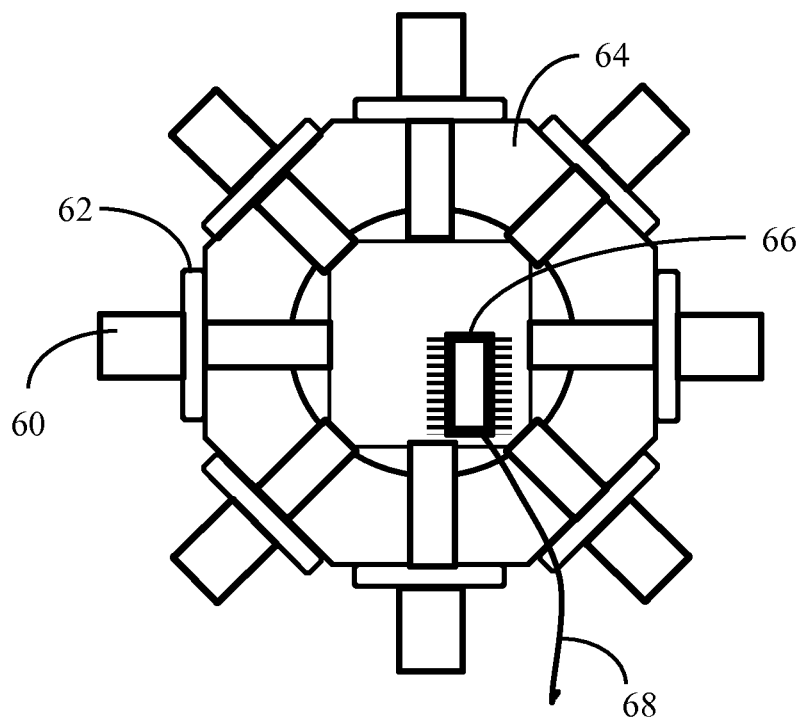
FIG. 5 is a schematic view of an embodiment of the apparatus of the invention.

In another aspect of the invention, with reference to FIG. 5, there are eight image sensors arranged radially in the form of an octagon, one per side.

The sensors 60 are preferably radially oriented on a processing card 64.

The signals forming the images acquired by the image sensors 60 are transmitted to an image processing unit 66 and from there the images can be sent through a cable 68, or using the wireless technology, to a computer screen, a video screen or a personal viewer.

Figure 6:
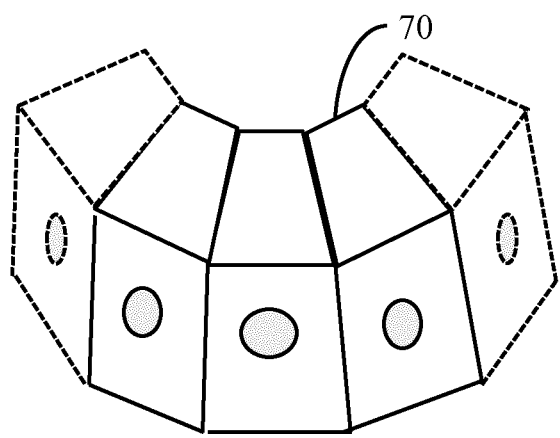
FIG. 6 is a schematic diagram showing base sensors 70 that can be arranged for producing a variety of configurations.

With reference to FIG. 6, this shows an embodiment of the device in which a plurality of sensors is radially oriented thanks to the radial orientation of a plurality of modules 70, each of which comprises a sensor and an image processing card.

In this way, the image-forming device 26 can be modularly constructed for coverage at 360 degrees or a $4\pi$ spherical view.

Figure 7:
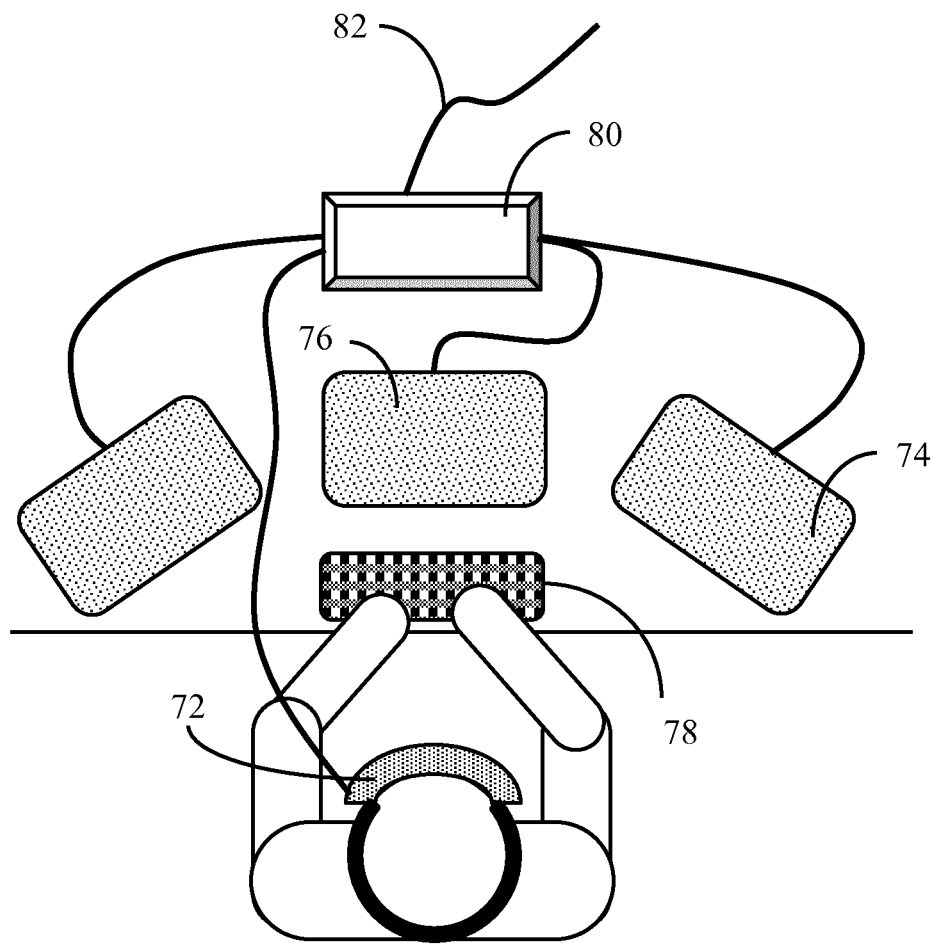
FIG. 7 is a schematic diagram illustrating the image that shows an operational inspection phase of the data collected by the apparatus of the previous figures.

With reference to FIG. 7, in another aspect of the invention, a personal viewing device 72, is provided, which can project panoramic or 3D images so that the operator can see the video using a 3D device for example of the ocular type or that can be worn as glasses, for the inspection and/or functioning of the furnace from the comfortable environment of a control room. The effect is therefore as if the operator were actually inside the furnace for as long as he wishes, but always in the same 30 seconds, as if time had stopped for him to carry out his control tasks.

Using the ocular-type device, the operator is able to look around and see the whole inner space of the furnace from its inside, which is preferably reconstructed as a spherical or virtual three-dimensional environment on the basis of the data revealed by the sensors.

The operator is therefore able to stop in a particular place and can develop and enlarge any area that needs to be analyzed in detail.

Thanks to the sensors that produce multiple data in the device 26, the level of detail and clarity of the video signal can be extremely high.

The same effects for the operator may also be provided by reproducing the images, captured by the image-forming device 26 on one or more screens 74 and 76, which can form part of the process control system of an industrial plant, for example a furnace or an overhead crane.

The operator can observe the images transmitted by the image-forming device 26 and perform actions through the control system of the industrial plants or equipment by means of an operation interface 78.

A computer or an image processor and manipulating means 80 can distribute the images received through a cable 82 to the desired screen and/or personal viewing device 72.

In another aspect of the invention, recording means are provided for keeping a record of the consecutive videos.

These videos can then be superposed to compare them with time.

The system can learn by experience and any important change revealed during the video-comparisons effected by the software, for example major colour changes that appear for small or large areas, are immediately reported to the operator as an area of potential risk.

The operator will be called to that particular point to analyze whether the change revealed in the video signal is related to a maintenance problem or any other particular problem.

The videos can also be kept in a historical database for future analysis, if necessary.

The invention can be applied and used for multiple purposes in different areas of a steelmaking plant, for example: detection of water leaks; refractory wear detection; hot residue assessment; detection of operational deviations; burner tuning support; maintenance of the refractory materials; alarm and supervision systems, and the like.

The invention can also be applied and used for controlling the status of any mechanical apparatus that may be difficult to see at a close distance, for example hot rotating bottom furnaces and movable furnaces, particularly for controlling the status of the mechanical equipment.

The invention can also be applied and used for tuning and adjusting chemical packages, for example for seeing the flames of burners at a close distance, in order to verify whether the combustion is taking place correctly or if the flow-rates need to be adjusted.

A visual control using the invention can also detect if the nozzle of a burner has been damaged, as the flame would be different from the reference standards.

Supersonic oxygen flows can be seen close up, to see whether the enveloping gasses need to be regulated in order to improve the coherence of the jet.

Even today, steelworkers exert various supervisory activities remaining in high-temperature and dangerous areas using protective clothing, but still exposed to a potential risk. The invention can be installed in these places and the supervisor can have the same ample view of the functioning, by projecting the images or videos onto a screen or wearing 3D glasses, for example, from a remote area, thus completely avoiding risk areas.

Numerous image-forming devices, situated in predetermined points, can be installed throughout the whole industrial plant and the same operator can advantageously virtually pass from one place to another without moving from his seat.

The present invention has been described with reference to some preferred embodiments, but skilled persons in the field will be capable of contemplating other variants and modifications which are deemed as being included within the context of the invention, whose scope should be ascertained by the following claims.

The invention claimed is:

1. An apparatus for inspection of a hostile or harsh environment comprising:
 a sensorized device (26) comprising a plurality of image sensors (42,44,46,48) positioned with different orientations with respect to each other, so as to detect image data or a plurality of images in a sequence forming a video of said hostile or harsh environment;
 a support (30) adapted to support said sensorized device in said hostile or harsh environment;
 a processor of said image data adapted to generate one or both of a spherical or three-dimensional image either static or as a sequence forming the video based on said image data; and
 a remote display device with respect to said sensorized device (26), adapted to be positioned outside the hostile or harsh environment and in communication with at least the processor of the image data,
 wherein said apparatus is adapted for said hostile or harsh environment, said hostile or harsh environment being in a high temperature furnace and having one or both of temperature characteristics or atmospheric contaminants harmful or dangerous for human beings,
 wherein said plurality of sensors having different orientations with respect to each other are sensors that detect contemporaneous image data of at least 60% of $4\pi$ steradians of said hostile or harsh environment,
 wherein said plurality of image sensors (42, 44, 46, 48) are housed inside a single protective shell (52),
 wherein said protective shell is polyhedral, and
 wherein said plurality of image sensors are disposed inside said protective shell to each view through a different one of at least five faces of said protective shell;
 further comprising a stable positioning system, adapted to position the sensorized device (26) consistently in a same, predetermined position within said hostile or harsh environment during subsequent inspections.

2. The apparatus according to claim 1, wherein said protective shell comprises a metal frame with transparent crystals applied to said frame, and is operatively connected to a cooling unit adapted to cool said shell with a cooling fluid.

3. The apparatus according to claim 1, wherein said image sensors (42,44,46,48) that detect the image data or the plurality of the images in the sequence forming the video are selected from the group consisting of sensors that are:
 sensitive to a visible portion of a light spectrum,
 sensitive to an infrared portion of the light spectrum,
 sensitive to an ultraviolet portion of the light spectrum;
 thermographic, or heat sensitive, or
 sensitive to X rays.

4. The apparatus according to claim 1, wherein said image sensors (42,44,46,48) are positioned so as to detect the contemporaneous image data of at least 90% of $4\pi$ steradians of said hostile or harsh environment.

5. The apparatus according to claim 1, wherein said image data comprise one or both of a video film or static images.

6. The apparatus according to claim 1, wherein there are five sensors disposed perpendicularly from one another.

7. The apparatus according to claim 1, wherein at least some of said plurality of sensors are disposed on a same plane spaced at less than 90° from one another.

8. A method of inspecting a hostile or harsh environment in a high temperature furnace, comprising the following steps:
 a. detecting, with image sensors (42,44,46,48), image data of said hostile or harsh environment without use of any moving parts during image data acquisition;
 b. transmitting said image data outside of said hostile or harsh environment; and
 c. re-processing said image data in order to reconstruct an image,
 wherein said method is implemented for inspection of the hostile or harsh environment which has one or both of temperature characteristics or atmospheric contaminants that are harmful or dangerous for human beings,
 wherein the step of detecting is performed with the image sensors (42,44,46,48) that detect contemporaneous image data of at least 60% of $4\pi$ steradians of said hostile or harsh environment, thereby creating one or both of a spherical or three-dimensional image or a plurality of images in sequence forming a video based on said image data, said image sensors (42,44,46,48) being housed in a protective shell (52), and
 wherein said step a. comprises introducing a single sensorized shell (26) containing the image sensors (42,44, 46,48) that acquires the image data in a predetermined position in said hostile or harsh environment, so as to detect the image data or a plurality of images in sequence forming a video comparable with other sets of image data acquired at a different time, to recognize pattern differences that are indicative of a dangerous situation taking place, said protective shell being polyhedral, and said plurality of image sensors being disposed inside said protective shell to each view through a different one of at least five faces of said protective shell.

9. The method according to claim 8, wherein said step a comprises detecting the image data of at least 90% of $4\pi$ steradians of said hostile or harsh environment.

10. The method according to claim 8, wherein said step a comprises detecting the image data using sensors sensitive to at least one of the following:
 a visible portion of a light spectrum,
 an infrared portion of the light spectrum,
 an ultraviolet portion of the light spectrum,
 thermographic, or heat sensitive, or
 sensitive to X rays.

11. The method according to claim 8, wherein said image data comprise one or both of video films or static images.

12. The method according to claim 8, further comprising the step of comparing the image data relating to a same area of the hostile or harsh environment taken at different moments.

* * * * *